US012748958B2

(12) United States Patent
Blagodurov et al.

(10) Patent No.: US 12,748,958 B2
(45) Date of Patent: Sep. 29, 2026

(54) DEVICES, SYSTEMS, AND METHODS FOR ACCELERATING SIAMESE NEURAL NETWORKS

(71) Applicant: Advanced Micro Devices, Inc., Santa Clara, CA (US)

(72) Inventors: Sergey Blagodurov, Bellevue, WA (US); Yao Cui Fehlis, Austin, TX (US); Jason P. Cain, Austin, TX (US); Karthik Ramu Sangaiah, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 860 days.

(21) Appl. No.: 17/952,708

(22) Filed: Sep. 26, 2022

(65) Prior Publication Data

US 2026/0187432 A1 Jul. 2, 2026

(51) Int. Cl.
*G06N 3/063* (2023.01)

(52) U.S. Cl.
CPC .................................... *G06N 3/063* (2013.01)

(58) Field of Classification Search
CPC ...................................................... G06N 3/063
See application file for complete search history.

(56) References Cited

U.S. PATENT DOCUMENTS 10,445,638 B1 * 10/2019 Amirineni .............. G06N 3/063
10,768,856 B1 * 9/2020 Diamant ............... G06F 3/0659
2015/0309961 A1 * 10/2015 Ozaki ...................... G06N 3/04 706/16
2018/0075338 A1 * 3/2018 Gokmen ................ G06N 3/065
2018/0130324 A1 * 5/2018 Yu ........................ G06N 3/0475
2019/0236049 A1 * 8/2019 Vantrease ............... G06F 17/15
2021/0158132 A1 * 5/2021 Huynh ................. G06N 3/0464
2024/0127068 A1 * 4/2024 Moloney .............. G06N 3/0495
2024/0428577 A1 * 12/2024 Nabavi .................. G06N 3/045

FOREIGN PATENT DOCUMENTS

WO WO-2024059636 A1 * 3/2024 ............. G06N 3/088

OTHER PUBLICATIONS

Lungu, Iulia Alexandra, et al. "Siamese networks for few-shot learning on edge embedded devices." IEEE Journal on Emerging and Selected Topics in Circuits and Systems 10.4 (2020): 488-497. (Year: 2020).*

(Continued)

*Primary Examiner* — Randall K. Baldwin
(74) *Attorney, Agent, or Firm* — Greenberg Traurig, LLP

(57) ABSTRACT

A hardware-accelerated siamese neural network device includes a first hardware-accelerated convolutional neural network (CNN) circuit configured to apply a certain weight to a first input at a specific moment of an operation. The hardware-accelerated siamese neural network device also includes a second hardware-accelerated CNN circuit configured to apply the certain weight to a second input at the specific moment of the operation. In addition, the hardware-accelerated siamese neural network device includes a classifier circuit configured to generate a score that represents a degree of similarity between the first input and the second input.

18 Claims, 6 Drawing Sheets

(56) References Cited

OTHER PUBLICATIONS

Wang, Xingbin, et al. "SNA: A Siamese Network Accelerator to Exploit the Model-Level Parallelism of Hybrid Network Structure." 2020 (Year: 2020).*

Bharadwaj, Skanda, Sumukha Prasad, and Mohamed Almekkawy. "An upgraded siamese neural network for motion tracking in ultrasound image sequences." IEEE transactions on ultrasonics, ferroelectrics, and frequency control 68.12 (2021): 3515-3527. (Year: 2021).*

Llina, Olga, et al. "A survey on symmetrical neural network architectures and applications." Symmetry 14.7 (2022): 1391. (Year: 2022).*

Farhad, Moomal, et al. "Enhanced classification of left ventricular hypertrophy in cardiac patients using extended Siamese CNN." Physics in Medicine & Biology 69.14 (2024): 145001. (Year: 2024).*

Wang, Kuan-Cheng, et al. "A Programmable Systolic-Array AI Accelerator System with High-Performance Model Quantization and Heart Disease Classification Algorithm Design." 2025 IEEE International Symposium on Circuits and Systems (ISCAS). IEEE, May 2025. (Year: 2025).*

Lubaib, P., et al. "Efficient Siamese Network Based Approach for Multi-Class ECG Classification in Arrhythmia Detection." 2025 Fifth International Conference on Advances in Electrical, Computing, Communication and Sustainable Technologies (ICAECT). IEEE, Jan. 2025. (Year: 2025).*

Capra, Maurizio, et al. "Hardware and software optimizations for accelerating deep neural networks: Survey of current trends, challenges, and the road ahead." IEEE Access 8 (2020): 225134-225180. (Year: 2020).*

Libano, F., P. Rech, and J. Brunhaver. "On the Reliability of Xilinx's Deep Processing Unit and Systolic Arrays for Matrix Multiplication." 2020 20th European Conference on Radiation and Its Effects on Components and Systems (RADECS). IEEE, 2020. (Year: 2020).*

* cited by examiner

DEVICES, SYSTEMS, AND METHODS FOR ACCELERATING SIAMESE NEURAL NETWORKS

BACKGROUND

Siamese neural networks are often used to detect specific features, objects, patterns, and/or configurations in images. Unfortunately, some siamese neural networks have shortcomings and/or deficiencies that impair the speed, efficiency, and/or performance of those siamese neural networks. The instant disclosure, therefore, identifies and addresses a need for additional and improved devices, systems, and methods for accelerating siamese neural networks.

BRIEF DESCRIPTION OF THE DRAWINGS

The accompanying drawings illustrate number of exemplary implementations and are a part of the specification. Together with the following description, these drawings demonstrate and explain various principles of the instant disclosure.

Figure 1:
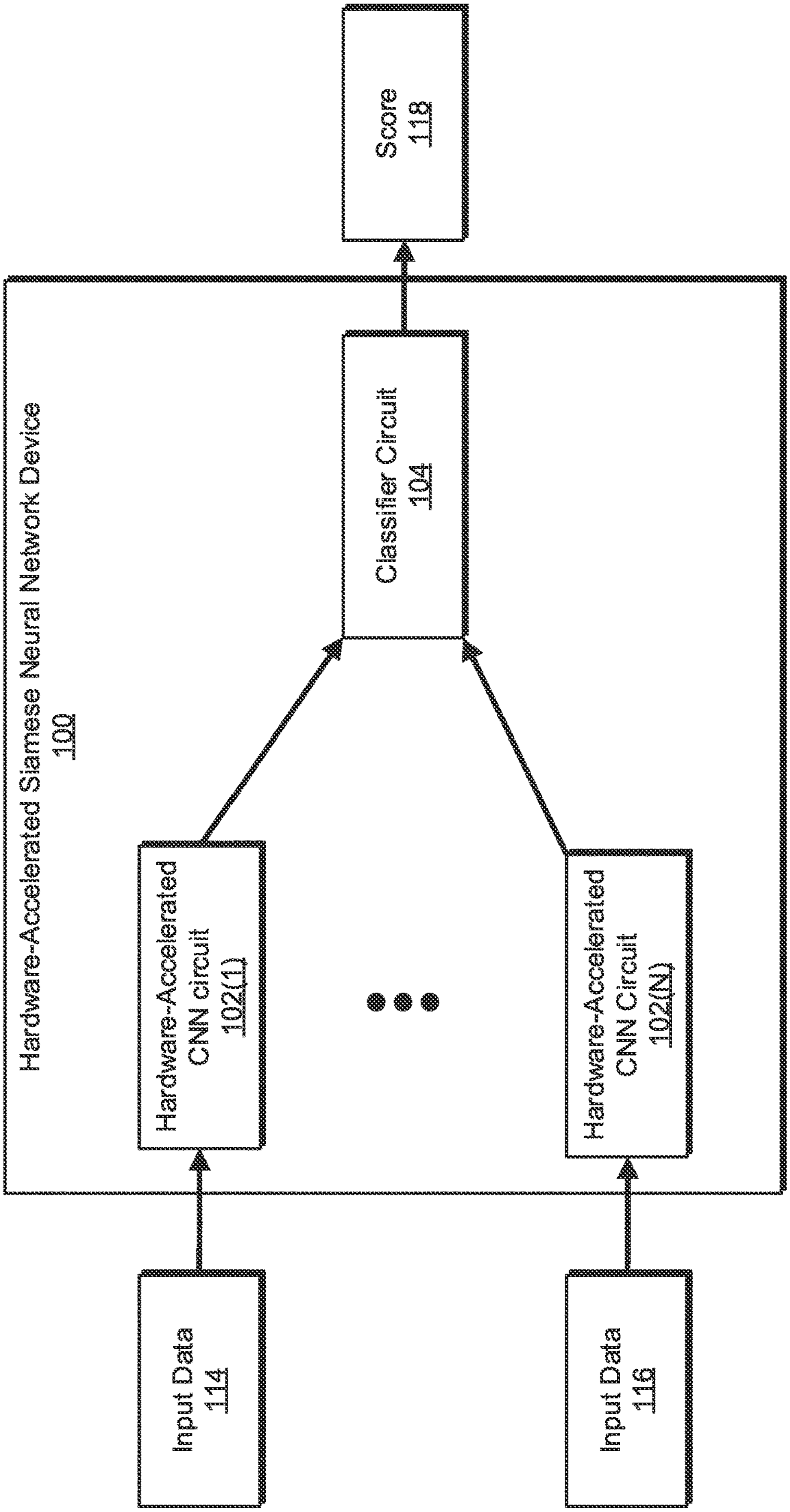
FIG. 1 is a block diagram of an exemplary hardware-accelerated siamese neural network device according to one or more implementations of this disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the instant disclosure covers all modifications, equivalents, and alternatives falling within the scope of the appended claims.

DETAILED DESCRIPTION OF EXEMPLARY IMPLEMENTATIONS

The present disclosure describes various devices, systems, and methods for accelerating siamese neural networks. As will be explained in greater detail below, the various devices, systems, and/or methods described herein can provide various benefits and/or advantages over certain traditional implementations of siamese neural networks. For example, the various devices, systems, and/or methods described herein can improve, increase, and/or optimize the speed, efficiency, and/or performance of siamese neural networks implemented and/or running on general-purpose computing devices (e.g., graphics processing units, central processing units, etc.).

In some examples, such general-purpose computing devices necessitate a significant amount of time to complete all the processing for a siamese neural network. More specifically, to implement and/or execute a siamese neural network, such general-purpose computing devices would need to support two instances of a convolutional neural network (CNN). Unfortunately, such general-purpose computing devices would need to compute and/or execute these two CNN instances serially and/or consecutively—as opposed to simultaneously and/or concurrently—to implement the siamese neural network. The serial and/or consecutive nature of such computations would cause and/or impose twice the amount of latency as a single instance of a CNN.

Alternatively, such general-purpose computing devices could compute and/or execute these two instances of CNNs in parallel if the CNNs were only half of their normal and/or ideal size. Unfortunately, use of half-sized CNNs could impair the accuracy of the siamese neural network, thus leading to higher rates of false positives and/or false negatives. Neither a serial-styled siamese neural network nor a siamese neural network that implements half-sized CNNs would be sufficient and/or satisfactory for certain applications.

In some examples, to address the deficiencies described in the above examples of traditional siamese neural networks, a computing equipment manufacturer can design, produce, and/or apply a special-purpose hardware device to implement and/or execute a hardware-accelerated siamese neural network. In one example, the special-purpose hardware device can include and/or represent a circuit, system, and/or hardware accelerator designed to perform, compute, implement, and/or execute a siamese neural network that simultaneously applies and/or reuses the same weights across the inputs. Examples of such a special-purpose hardware device include, without limitation, systems-on-chips (SoCs), application-specific integrated circuits (ASICs), field-programmable gate arrays (FPGAs), combinations or variations of one or more of the same, and/or any other suitable special-purpose hardware device.

In some examples, the special-purpose hardware device can enable the hardware-accelerated siamese neural network to simultaneously and/or concurrently implement two or more instances of CNNs in parallel without any reduction from their normal and/or ideal size. As a result, the hardware-accelerated siamese neural network would avoid incurring twice the amount of latency as a single instance of a CNN. Moreover, the hardware-accelerated siamese neural network would avoid the higher false positive and/or negative rates that result from implementing half-sized CNNs. The hardware-accelerated siamese neural network would thus be sufficient and/or satisfactory for certain applications that elude traditional siamese neural networks.

In some examples, the hardware-accelerated siamese neural network implements two or more identical CNN circuits to convolve objects and/or features for the subsequent comparison with one another. In such examples, each CNN circuit can include and/or support its own input (e.g., 2 inputs for 2 CNN circuits, 3 inputs for 3 CNN circuits, etc.). Additionally or alternatively, the hardware-accelerated siamese neural network implements a classifier circuit that compares the convolved objects and/or features with one another to compute and/or measure a distance between them. The classifier circuit can then apply a sigmoid activation function to the distance to determine a level of similarity or difference between the objects and/or features.

In some examples, all the CNNs implemented in the hardware-accelerated siamese neural network apply the same weights and/or parameters to their respective inputs at the same time. In one example, each CNN outputs and/or delivers a fully connected layer to the classifier circuit for distance computations and/or similarity determinations. In one example, the hardware-accelerated siamese neural network learns and/or is trained to minimize the distance measured and/or computed for very similar objects and/or features. Additionally or alternatively, the hardware-accelerated siamese neural network learns and/or is trained to maximize the distance measured and/or computed for very dissimilar objects and/or features.

In some examples, the hardware-accelerated siamese neural network can learn and/or be trained by processing training data via one or more loss functions, such as a triplet loss function, a contrastive loss function, and/or a binary cross-entropy loss function. In such examples, regardless of the loss function used in training, the resulting CNNs included in the hardware-accelerated siamese neural network can be identical to one another, meaning that all the CNNs apply and/or reuse the same weights, parameters, and/or operators.

In some examples, a hardware-accelerated siamese neural network device includes a first hardware-accelerated CNN circuit configured to apply a certain weight to a first input at a specific moment of an operation and a second hardware-accelerated CNN circuit configured to apply the certain weight to a second input at the specific moment of the operation, In such examples, the hardware-accelerated siamese neural network device also includes a classifier circuit configured to generate a score that represents a degree of similarity between the first input and the second input.

In some examples, the hardware-accelerated siamese neural network device also includes at least one ASIC that implements the first hardware-accelerated CNN circuit, the second hardware-accelerated CNN circuit, and the classifier circuit. Additionally or alternatively, the ASIC comprises a systolic array that includes a plurality of data processing units (DPUs) that facilitate simultaneous processing of the first input and the second input in parallel. In one example, the DPUs included in the systolic array are communicatively coupled to one another via a plurality of data lanes that facilitates passing the first input and the second input from one of the DPUs to another one of the DPUs simultaneously.

In some examples, the first hardware-accelerated CNN circuit is equipped with a first data lane configured to feed the first input to a first DPU included in the systolic array. In such examples, the second hardware-accelerated CNN circuit is equipped with a second data lane configured to feed the second input to the first DPU included in the systolic array. In one example, each of the DPUs comprises a plurality of processing lanes that facilitate simultaneous processing of the first input and the second input in parallel. In this example, each of the processing lanes comprises a multiply circuit and an add circuit.

In some examples, the DPUs included in the systolic array are communicatively coupled to one another via a single data lane. In such examples, the DPUs are configured to vectorize the first input and the second input into a data vector and/or pass the data vector from one of the DPUs to another one of the DPUs via the single data lane for subsequent processing.

In some examples, the first hardware-accelerated CNN circuit is further configured to output a first fully connected layer representative of a convolution performed on the first input. In such examples, the second hardware-accelerated CNN circuit is further configured to output a second fully connected layer representative of a convolution performed on the second input. Additionally or alternatively, the classifier circuit is further configured to generate the score by comparing the first fully connected layer and the second fully connected layer to one another.

In some examples, the classifier circuit is further configured to compare the first fully connected layer and the second fully connected layer by applying a sigmoid activation function. In one example, the hardware-accelerated siamese neural network device includes a storage device configured to store the first input in a dataset. Additionally or alternatively, the first input includes a reference object known to belong to a certain class of interest, and the second input includes an unknown object.

In some examples, the first hardware-accelerated CNN circuit is trained with a set of training data, and the second hardware-accelerated CNN circuit is trained with the set of training data such that both the first hardware-accelerated CNN circuit and the second hardware-accelerated CNN circuit share identical weights upon completion of training. In one example, the set of training data includes positive data pairs that belong to a single class of interest and negative data pairs that belong to different classes of interest. In this example, the classifier circuit is trained by randomly sampling examples of the positive data pairs and the negative data pairs. Additionally or alternatively, the classifier circuit is trained by processing the training data via a loss function such as a triplet loss function, a contrastive loss function, and/or a binary cross-entropy loss function.

In some examples, the set of training data includes an anchor object that belongs to a certain class of interest, a positive object known to be similar to the anchor object, and/or a negative object known to be dissimilar to the anchor object. In one example, the classifier circuit is trained by deliberately sampling the anchor object, the positive object, and the negative object in connection with the certain class of interest. Additionally or alternatively, the classifier circuit is further configured to classify the second input based at least in part on the score. Further, the classifier circuit is configured to provide the classification of the second input to a computing component configured to perform at least one action in response to the classification.

In some examples, a system includes a storage device configured to store reference data and a hardware-accelerated siamese neural network communicatively coupled to the storage device. In one example, the hardware-accelerated siamese neural network includes a first hardware-accelerated CNN circuit configured to apply a certain weight to a first input at a specific moment of an operation, a second hardware-accelerated CNN circuit configured to apply the certain weight to a second input comprising at least a portion of the reference data at the specific moment of the operation, and a classifier circuit configured to generate a score that represents a degree of similarity between the first input and the second input. In one implementation, the system consists of a processor and/or a computer.

In some examples, a method includes configuring a first hardware-accelerated CNN circuit to apply a certain weight to a first input at a specific moment of an operation. In such examples, the method also includes configuring a second hardware-accelerated CNN circuit to apply the certain weight to a second input at the specific moment of the operation. In one example, the method further includes communicatively coupling the first hardware-accelerated CNN and the second hardware-accelerated CNN to a classifier circuit configured to generate a score that represents a degree of similarity between the first input and the second input.

The following will provide, with reference to FIGS. 1-5, detailed descriptions of exemplary devices, systems, and/or corresponding implementations for accelerating siamese neural networks. Detailed descriptions of an exemplary method for accelerating siamese neural networks will be provided in connection with FIG. 6.

FIG. 1 shows an exemplary hardware-accelerated siamese neural network device 100 that facilitates accelerating siamese neural networks. As illustrated in FIG. 1, exemplary hardware-accelerated siamese neural network device 100 includes and/or represents hardware-accelerated CNN circuits 102(1)-(N) and a classifier circuit 104. In some examples, classifier circuit 104 is communicatively coupled to hardware-accelerated CNN circuits 102(1)-(N). In one example, hardware-accelerated CNN circuit 102(1) accepts input data 114, and hardware-accelerated CNN circuit 102(N) accepts input data 116. In this example, classifier circuit 104 generates a score 118 that represents a degree of similarity between input data 114 and 116.

In some examples, the hardware-accelerated character of siamese neural network device 100 indicates the exclusion and/or omission of general-purpose computing devices (e.g., graphics processing units, central processing units, etc.). In such examples, hardware-accelerated siamese neural network device 100 can be contrasted against and/or distinguished from general-purpose computing devices that implement siamese neural networks.

In some examples, hardware-accelerated siamese neural network device 100 includes and/or represents all or a portion of an ASIC. Additionally or alternatively, hardware-accelerated siamese neural network device 100 is implemented across multiple ASICs. In other examples, hardware-accelerated siamese neural network device 100 includes and/or represents all or a portion of an SoC. In further examples, hardware-accelerated siamese neural network device 100 includes and/or represents all or a portion of an FPGA.

In some examples, hardware-accelerated siamese neural network device 100 constitutes and/or represents an ASIC that includes a systolic array of DPUs and/or cells that facilitate simultaneous processing of input data 114 and 116 in parallel. In one example, hardware-accelerated CNN circuit 102(1)-(N) apply and/or share the same weights, operators, and/or parameters. Such weights, operators, and/or parameters can be applied to the inputs at various moments in the lifecycle of hardware-accelerated siamese neural network device 100. Examples of such moments include, without limitation, during training, during testing, during validation, during inferencing, while performing operations (e.g., multiply-accumulate operations), combinations or variations of one or more of the same, and/or any other suitable moments in the lifecycle of a hardware-accelerated siamese neural network device.

In some examples, hardware-accelerated CNN circuit 102(1) outputs a fully connected layer representative of a convolution performed on input data 114, and hardware-accelerated CNN circuit 102(N) outputs a fully connected layer representative of a convolution performed on input data 116. Additionally or alternatively, classifier circuit 104 generates score 118 by comparing the first fully connected layer and the second fully connected layer to one another. In one variation, classifier circuit 104 applies a sigmoid activation function to the first and second fully connected layers to perform the comparison.

In some examples, hardware-accelerated CNN circuits 102(1)-(N) each include and/or represent a special-purpose circuit, device, and/or hardware accelerator designed to perform, compute, implement, and/or execute a CNN. In one example, hardware-accelerated CNN circuits 102(1)-(N) can include and/or represent analog and/or digital circuitry with combinations of transistors, resistors, capacitors, diodes, inductors, switches, registers, flipflops, connections, traces, buses, semiconductor (e.g., silicon) devices and/or structures, circuit boards, housings, combinations or variations of one or more of the same, and/or any other suitable components and/or features that facilitate hardware-accelerating CNNs. Additionally or alternatively, hardware-accelerated CNN circuits 102(1)-(N) can include and/or represent processing elements (e.g., modified systolic array multiply-accumulate processing elements).

In some examples, classifier circuit 104 includes and/or represents a special-purpose circuit, device, and/or hardware accelerator designed to measure a distance between the inputs, generate a score that represents a degree of similarity between the inputs, and/or classify one of the inputs as a certain image or feature. In one example, classifier circuit 104 can include and/or represent analog and/or digital circuitry with combinations of transistors, resistors, capacitors, diodes, inductors, switches, registers, flipflops, connections, traces, buses, semiconductor (e.g., silicon) devices and/or structures, circuit boards, housings, combinations or variations of one or more of the same, and/or any other suitable components and/or features that facilitate hardware-accelerating CNNs. The inputs fed and/or provided to hardware-accelerated CNN circuits 102(1)-(N) can include and/or represent any type or form of data, object, image, video, audio, and/or feature.

In some examples, hardware-accelerated siamese neural network device 100 can include and/or incorporate one or more additional components that are not explicitly represented and/or illustrated in FIG. 1. For example, hardware-accelerated siamese neural network device 100 can include and/or incorporate one or more storage devices that store the input data 114 in a dataset. In one example, input data 114 includes and/or represents a reference object known to belong to a certain class of interest, and input data 116 includes an unknown object under evaluation. More specifically, input data 114 can include and/or represent a pre-selected exemplar image, and input data 116 can include and/or represent a larger search image. In this example, hardware-accelerated siamese neural network device 100 can be tasked with locating the pre-selected exemplar image inside the larger search image. In certain variations, classifier circuit 104 generates a score that represents the degree of difference between the reference object and the unknown object.

Figure 2:
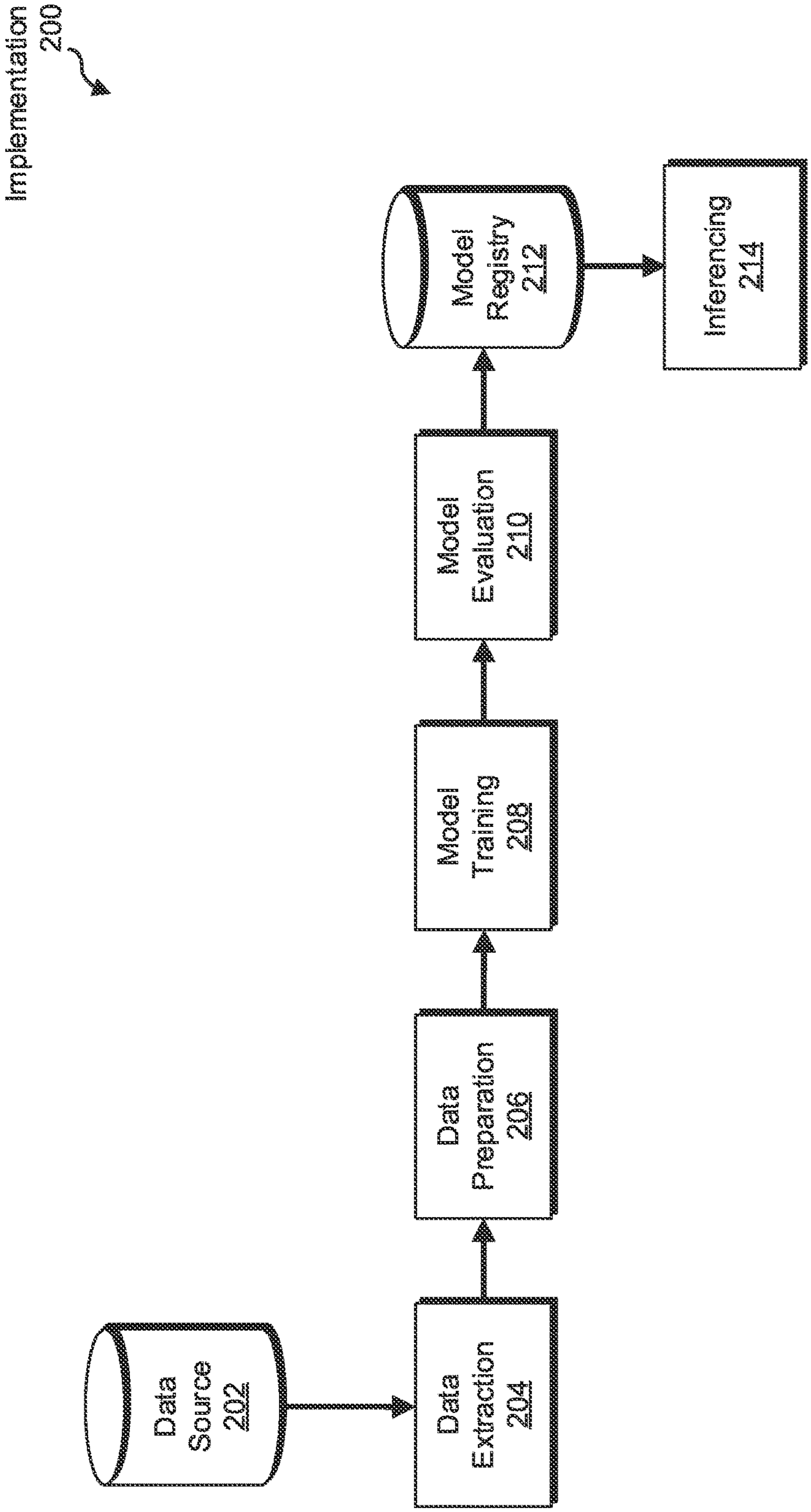
FIG. 2 is a block diagram of an exemplary implementation of an analytics flow for a hardware-accelerated siamese neural network device according to one or more variations of this disclosure.

FIG. 2 shows an exemplary implementation 200 of an analytics flow for hardware-accelerated siamese neural network device 100. In some examples, hardware-accelerated siamese neural network device 100 can be prepared for training and/or machine learning. In one example, an electronic design automation (EDA) tool can analyze a data source 202 and perform a data extraction 204. In this example, the EDA tool and/or another application or device can complete a data preparation 206 in which the data extracted from data source 202 is labelled into different classes. In certain implementations, data preparation 206 can involve and/or represent objects or images that are sufficiently similar to one another being labelled into the same class and/or objects or images that are not sufficiently similar to one another being labelled into different classes.

In some examples, data preparation 206 can involve and/or represent positive and/or negative pairs of objects or images being randomly created and/or assembled. In one example, the EDA tool and/or another application or device can perform a model training 208 in which a machine-learning model is trained via at least a portion of the labelled data. In this example, the EDA tool and/or another application or device can use and/or support any number of loss functions to train the machine-learning model. Examples of such loss functions include, without limitation, triplet loss functions, contrastive loss functions, binary cross-entropy loss functions, combinations or variations of one or more of the same, and/or any other suitable loss functions.

In some examples, the EDA tool and/or another application or device can then perform a model evaluation 210 in which the machine-learning model is evaluated, tested, and/or validated via another portion of the labelled data. In such examples, the EDA tool and/or another application or device can upload and/or store the trained or validated machine-learning model to a model registry 212 for subsequent distribution. In one example, hardware-accelerated siamese neural network device 100 can implement and/or apply the trained or validated machine-learning model. For example, hardware-accelerated siamese neural network device 100 implements and/or applies the trained or validated machine-learning model to classify an unknown input relative to a known input via inferencing 214.

In some examples, hardware-accelerated CNN circuits 102(1)-(N) are each trained with the same set of training data. In such examples, the training can involve forward passes and/or back propagations of the same weights and/or updates. Upon completion of the training, hardware-accelerated CNN circuits 102(1)-(N) share identical weights, operators, and/or parameters. In one example, the set of training data includes and/or represents positive data pairs that belong to a single class of interest and negative data pairs that belong to different classes of interest. In this example, classifier circuit 104 can be trained by randomly sampling examples and/or instances of the positive and/or negative data pairs. Additionally or alternatively, classifier circuit 104 can be trained by deliberately sampling specific examples and/or instances of the positive and/or negative data pairs.

In some examples, the set of training data includes and/or represents an anchor object that belongs to a certain class of interest, a positive object known to be similar to the anchor object, and/or a negative object known to be dissimilar to the anchor object. In such examples, classifier circuit 104 is trained by deliberately sampling the anchor object, the positive object, and the negative object in connection with the certain class of interest. In one example, classifier circuit 104 classifies and/or categorizes the second input based at least in part on the score. Additionally or alternatively, classifier circuit 104 provides and/or delivers the classification of the second input to a computing component, circuit, and/or device that performs at least one action in response to the classification. Examples of such an action includes, without limitation, fixing hotspots identified in lithography, modifying a direction or speed of a vehicle, controlling an artificial intelligence (AI) (e.g., a chatbot or robot), notifying a user of a predicted error or potential danger, combinations or variations of one or more of the same, and/or any other suitable action.

As a specific example, hardware-accelerated siamese neural network device 100 can be applied and/or implemented in the context of lithography hotspot identification. For example, hardware-accelerated siamese neural network device 100 can use the machine-learning model to predict and/or infer hotspots in the layout of semiconductor designs before the initial product tape-out so that the semiconductor designer is able to fix the hotspots ahead of the manufacturing process. In this example, hardware-accelerated siamese neural network device 100 can use known hotspot observations to generalize and/or extrapolate hotspot predictions to new hotspot patterns that might be undetectable via traditional pattern-matching techniques.

Figure 3:
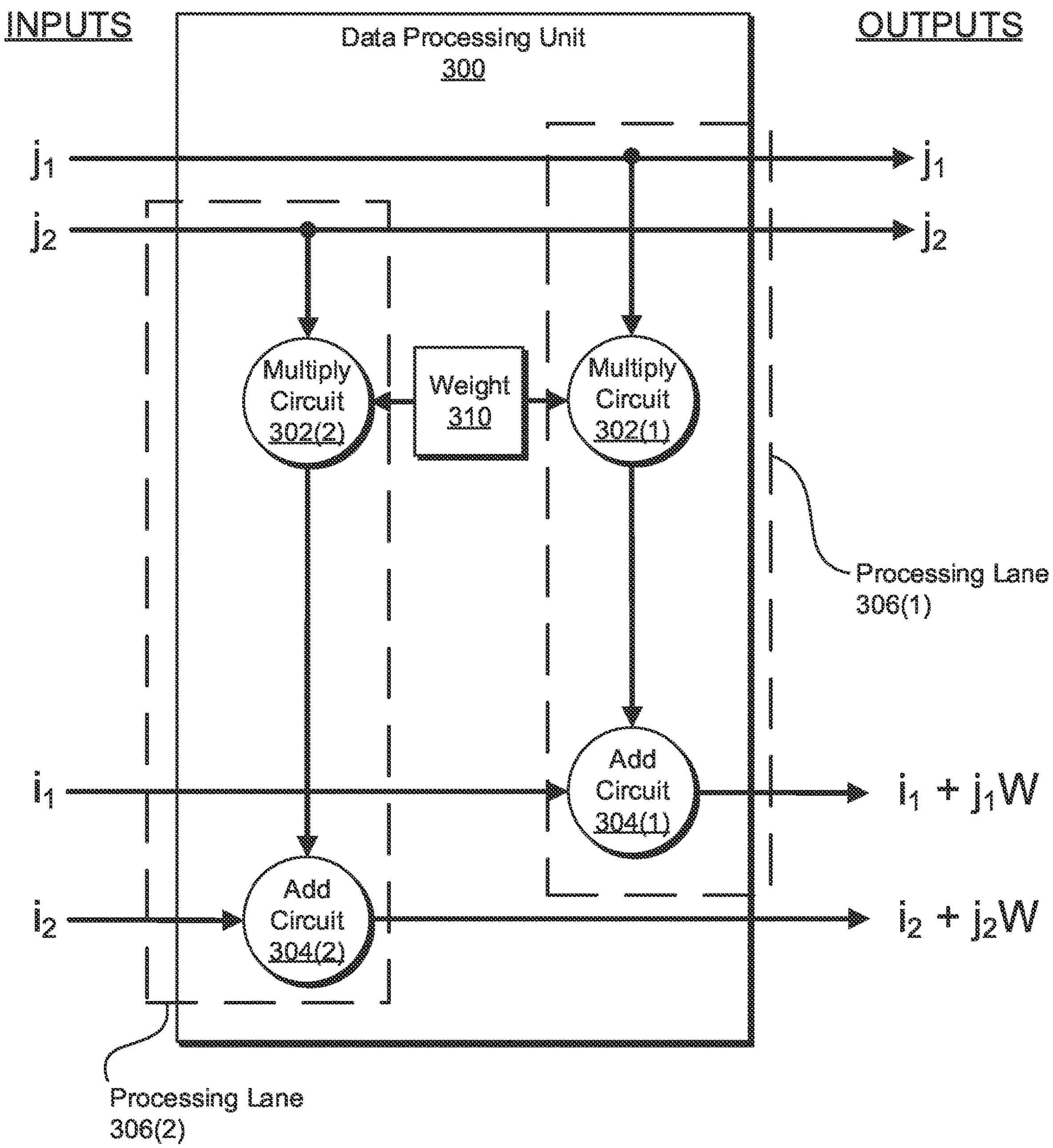
FIG. 3 is a block diagram of an exemplary data processing unit implemented in a hardware-accelerated siamese neural network device according to one or more variations of this disclosure.

FIG. 3 shows an exemplary DPU 300 implemented as a cell within the CNNs of hardware-accelerated siamese neural network device 100. As illustrated in FIG. 3, exemplary DPU 300 includes and/or represents inputs ($i_1$, $i_2$, $j_1$, and $j_2$) and outputs ($j_1$, $j_2$, $i_1+j_1W$, and $i_2+j_2W$). In one example, $i_1$ and $j_1$ Include and/or represent objects of a first matrix that constitute and/or derive from input data 114, and $i_2$ and $j_2$ include and/or represent objects of a second matrix that constitute and/or derive from input data 116. In this example, DPU 300 simultaneously multiplies both $j_1$ and $j_2$ by a weight 310 and then adds $i_1$ and $i_2$ to $j_1W$ and $j_2W$, respectively. Although two matrix inputs are shown in FIG. 3, the DPU 300 may be expanded and/or adapted to accommodate multiple matrix inputs.

In some examples, DPU 300 includes and/or represents processing lanes 306(1) and 306(2) that facilitate simultaneous processing of inputs $i_1$, $i_2$, $j_1$, and $j_2$ in parallel. In such examples, processing lanes 306(1) and 306(2) can include and/or represent one or more conductors, traces, wires, and/or buses that facilitate the flow, passage, and/or processing of data through DPU 300 in a parallel fashion. In one example, processing lane 306(1) includes and/or represents a multiply circuit 302(1) and an add circuit 304(1). In this example, multiply circuit 302(1) multiplies $j_1$ and weight 310 together to form $j_1W$, and add circuit 304(1) adds $i_1$ to the product of the multiplication to form $i_1+j_1W$ as an output of DPU 300 resulting from input data 114.

Additionally or alternatively, processing lane 306(2) includes and/or represents a multiply circuit 302(2) and an add circuit 304(2). In this example, multiply circuit 302(2) multiplies $j_2$ and weight 310 together to form $j_2W$, and add circuit 304(2) adds $i_2$ to the product of the multiplication to form $i_2+j_2W$ as an output of DPU 300 resulting from input data 116.

In some examples, multiply circuits 302(1) and 302(2) can include and/or represent any type or form of device and/or circuitry capable of performing multiplication operations. Examples of multiply circuits 302(1) and 302(2) include, without limitation, multiplier-accumulator units, binary multipliers, floating-point units, complex arithmetic logic units, combinations or variations of one or more of the same, portions of one or more of the same, and/or any other suitable multiply circuits. In some examples, add circuits 304(1) and 304(2) can include and/or represent any type or form of device and/or circuitry capable of performing addition operations. Examples of add circuits 304(1) and 304(2) include, without limitation, multiplier-adder units, adders, summers, arithmetic logic units, combinations or variations of one or more of the same, portions of one or more of the same, and/or any other suitable add circuits. In one example, each processing lane and/or channel of DPU 300 can include and/or represent a multiplier-accumulator unit that performs both the multiplication operations and the addition operations.

In some examples, various DPUs can be chained and/or assembled together in the systolic arrays of hardware-accelerated CNN circuits 102(1)-(N). In such examples, the DPUs can serve as processing elements that have pre-loaded weights and collectively perform multiply-accumulate operations. In one example, matrix values can be streamed into the systolic array one after the other to support the multiply-accumulate operations. For example, $j_1$ and $j_2$ can constitute and/or represent matrix inputs, and $i_1$ and $i_2$ can constitute and/or represent accumulated partial products.

Figure 4:
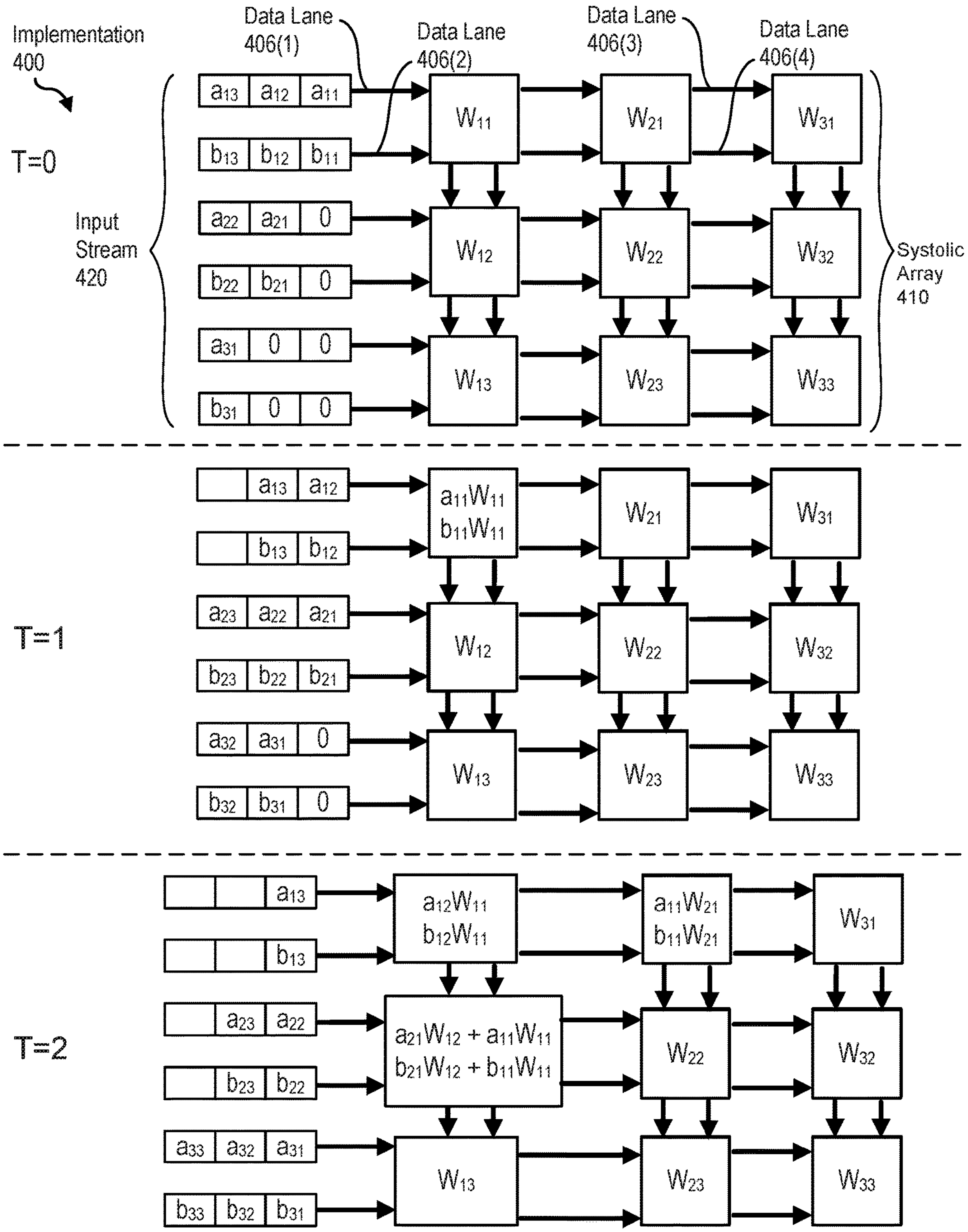
FIG. 4 is a block diagram of an exemplary implementation of an analytics flow for a hardware-accelerated siamese neural network device according to one or more variations of this disclosure.

FIG. 4 shows an exemplary implementation 400 of a systolic array 410 for performing matrix multiply-accumulate operations within hardware-accelerated CNN circuits 102(1)-(N). In some examples, exemplary implementation 400 involves feeding and/or delivering an input stream 420 of matrix values to systolic array 410. In one example, systolic array 410 includes and/or represents various DPUs and/or cells configured to perform multiply-accumulate operations on input stream 420 of matrix values. In this example, these DPUs and/or cells are configured and/or programmed to apply certain weights (e.g., $W_{11}$, $W_{12}$, $W_{13}$, $W_{21}$, $W_{22}$, $W_{23}$, $W_{31}$, $W_{32}$, and/or $W_{33}$) to input stream 420 of matrix values.

In some examples, input stream 420 includes and/or represents the simultaneous and/or concurrent delivery of matrix values from both input data 114 and input data 116. For example, all matrix values represented by the letter "a" in input stream 420 originate and/or derive from a first input, and all matrix values represented by the letter "b" in input stream 420 originate and/or derive from a second input. In other words, inputs represented by the notation "$a_{ij}$" refer to values of a first input matrix streamed into systolic array 410, and inputs represented by the notation "$b_{ij}$" refer to values of a second input matrix streamed into systolic array 410. In one example, systolic array 410 is able to process the data from the first and second inputs simultaneously and/or concurrently by reusing the same weights on both of the first and second inputs.

As a specific example, implementation 400 involves preparing and/or loading the matrix values into input stream 420 for feeding and/or delivering the same to systolic array 410 at a first moment in time (T=0). In this example at the first moment in time, implementation 400 involves preparing and/or loading input data an and bu for simultaneous delivery to and processing by a first DPU and/or cell included in systolic array 410, input data 0 and 0 for simultaneous delivery to and processing by a second DPU and/or cell included in systolic array 410, and/or input data 0 and 0 for simultaneous delivery to and processing by a third DPU and/or cell included in systolic array 410.

Continuing with this example at a second moment in time (T=1), implementation 400 involves simultaneously processing input data $a_{11}$ and $b_{11}$ at the first DPU and/or cell included in systolic array 410 by applying and/or reusing Win for both of input data $a_{11}$ and $b_{11}$. Such simultaneous processing leads to products and/or outputs $a_{11}W_{11}$ and $b_{11}W_{11}$ from the first DPU and/or cell. In this example at the second moment in time, implementation 400 also involves preparing and/or loading input data $a_{12}$ and $b_{12}$ for simultaneous delivery to and processing by the first DPU and/or cell included in systolic array 410, input data $a_{21}$ and $b_{21}$ for simultaneous delivery to and processing by the second DPU and/or cell included in systolic array 410, input data 0 and 0 for simultaneous delivery to and processing by the third DPU and/or cell included in systolic array 410.

Continuing with this example at a third moment in time (T=2), implementation 400 involves simultaneously processing input data $a_{12}$ and $b_{12}$ at the first DPU and/or cell included in systolic array 410 by applying and/or reusing Wu for both of input data $a_{12}$ and $b_{12}$. Such simultaneous processing leads to products and/or outputs $a_{12}W_{11}$ and $b_{12}W_{11}$ from the first DPU and/or cell. Further at the third moment, implementation 400 involves simultaneously propagating input data $a_{11}$ and $b_{11}$ to the second DPU and/or cell included in systolic array 410 for processing. The subsequent processing performed at the second DPU and/or cell involves applying and/or reusing $W_{12}$ for input data $a_{21}$ and $b_{21}$, thereby resulting in products and/or outputs $a_{21}W_{12}$ and $b_{21}W_{12}$, respectively. In one example, $a_{21}W_{12}+a_{11}W_{11}$ and $b_{21}W_{12}+b_{11}W_{11}$ can constitute and/or represent separate statements or values corresponding to separate operations performed in parallel by the second DPU and/or cell, which applies and/or reuses weight $W_{12}$.

Additionally at the third moment, implementation 400 involves simultaneously propagating input data $a_{11}$ and $b_{11}$ to a fourth DPU and/or cell included in systolic array 410 for processing. The subsequent processing performed at the fourth DPU and/or cell involves applying and/or reusing $W_{21}$ for both input data an and bis, thereby resulting in products and/or outputs $a_{11}W_{21}$ and $b_{11}W_{21}$, respectively.

In some examples, $j_1$ and $j_2$ in FIG. 3 can correspond to and/or represent matrix inputs and/or values that flow from left to right across systolic array 410 in FIG. 4. Additionally or alternatively, $i_1$ and $i_2$ in FIG. 3 can correspond to and/or represent partial products that accumulate while flowing downward in systolic array 410 of FIG. 4.

In some examples, the inputs to systolic array 410 constitute and/or represent multiple data lanes that facilitate simultaneous and/or concurrent delivery from both input data 114 and input data 116. For example, systolic array 410 can include and/or represent data lanes 406(1) and 406(2) by which portions of input stream 420 pass and/or enter the first DPU in systolic array 410. In other words, systolic array 410 includes and/or represents a first hardware-accelerated CNN circuit equipped with data lane 406(1) configured to feed inputs $a_{11}$, $a_{12}$, and $a_{13}$ to the first DPU in systolic array 410. In addition, systolic array 410 includes and/or represents a second hardware-accelerated CNN circuit equipped with data lane 406(2) configured to feed inputs $b_{11}$, $b_{12}$, and bis to the first DPU in systolic array 410. Systolic array 410 also includes and/or represents various other similar data lanes configured to feed portions of input stream 420 to other DPUs within systolic array 410 in parallel.

In some examples, systolic array 410 includes and/or represents data lanes between each of the adjacent DPUs, and these data lanes can facilitate simultaneous and/or concurrent delivery of data from one DPU to another for the two hardware-accelerated CNNs. For example, systolic array 410 include and/or represent data lanes 406(3) and 406(4) by which data traversing through the two hardware-accelerated CNNs simultaneously pass from one DPU to another in parallel. Systolic array 410 also includes and/or represents various other similar data lanes configured to simultaneously pass data from one DPU to another adjacent DPU in parallel. In one example, data lanes 406(1)-(4) can include and/or represent one or more conductors, traces, wires, and/or buses that facilitate the flow, passage, and/or delivery of data from one DPU to another in a parallel fashion.

In other examples, systolic array 410 can include and/or represent various DPUs that are communicatively coupled to one another via a single data lane, as opposed to double-wide and/or parallel data lanes. In such examples, each DPU is configured to perform the multiplication and/or addition operations on incoming data for both CNNs simultaneously and then vectorize the results of those operations into a data vector and/or a single stream for delivery to the next DPU via the single data lane. Accordingly, upon completion of the vectorization of the results of those operations across the CNNs, the DPU can pass the data vector to the next DPU via the single data lane for subsequent processing.

In some examples, as the data vector arrives, the next DPU can de-vectorize and/or parse the data vector to separate the constituent data components corresponding to the different CNNs. In such examples, this DPU can perform the multiplication and/or addition operations on those constituent data components simultaneously and then vectorize the results of those operations into another data vector for delivery to the following DPU via another single data lane. The process can continue in this manner until the data reaches the end of systolic array 410.

Figure 5:
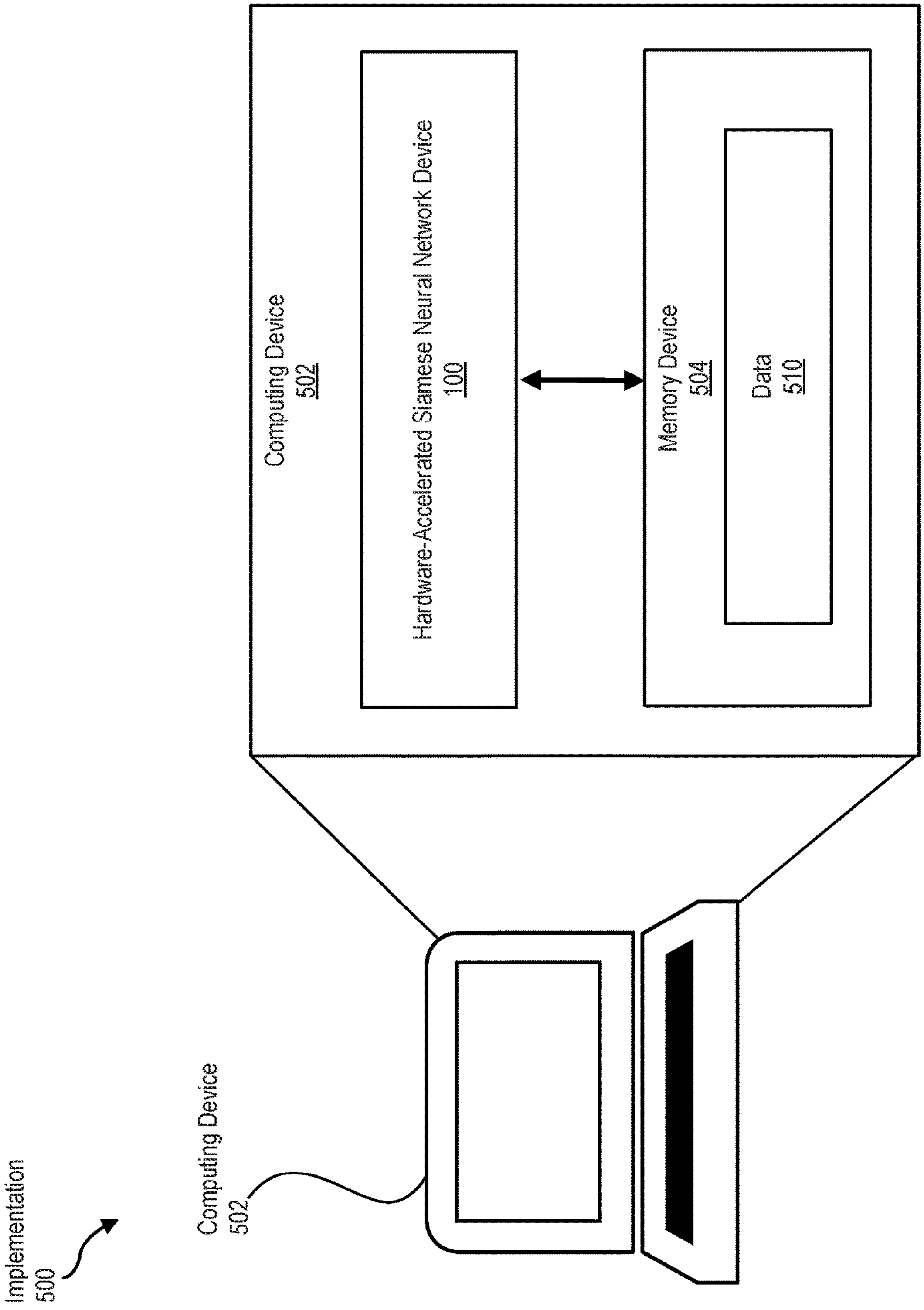
FIG. 5 is a block diagram of an exemplary implementation of a computing device that includes a hardware-accelerated siamese neural network device according to one or more embodiments of this disclosure.

FIG. 5 illustrates an exemplary implementation 500 involving a computing device 502. As illustrated in exemplary implementation 500 in FIG. 5, computing device 502 includes and/or represents hardware-accelerated siamese neural network device 100 communicatively coupled to a memory device 504. In some examples, memory device 504 maintains and/or stores data 510 used to train hardware-accelerated siamese neural network device 100 and/or perform inferencing and/or predictions. For example, computing device 502 can feed and/or provide a portion of data 510 to a first input of hardware-accelerated siamese neural network device 100 and an unknown image to a second input of hardware-accelerated siamese neural network device 100. In this example, hardware-accelerated siamese neural network device 100 can output a classification of the unknown image and/or a score representative of the level of similarity between the portion of data 510 and the unknown image.

Computing device 502 can include and/or represent a variety of different systems and/or computers capable of implementing hardware-accelerated siamese neural network device 100. Examples of computing device 502 include, without limitation, routers, switches, hubs, modems, bridges, repeaters, gateways, network devices, client devices, laptops, tablets, desktops, servers, cellular phones, Personal Digital Assistants (PDAs), multimedia players, embedded systems, wearable devices, gaming consoles, portions of one or more of the same, variations or combinations of one or more of the same, and/or any other suitable device.

In some examples, memory device 504 can include and/or represent any type or form of volatile or non-volatile storage device or medium capable of storing data and/or computer-readable instructions. Examples of memory device 504 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable memory device.

Although not necessarily represented in this way in FIG. 5, a distributed system can implement hardware-accelerated siamese neural network 100 that draws on and/or uses reference data stored remotely. For example, computing device 502 can be communicatively coupled to a remote server via a network. In this example, the remote server can store some or all of data 510, and computing device 502 can access and/or obtain from the remote server a portion of data 510 to use as one or more inputs for hardware-accelerated siamese neural network device 100. Examples of such a network include, without limitation, an intranet, an Internet protocol (IP) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 6:
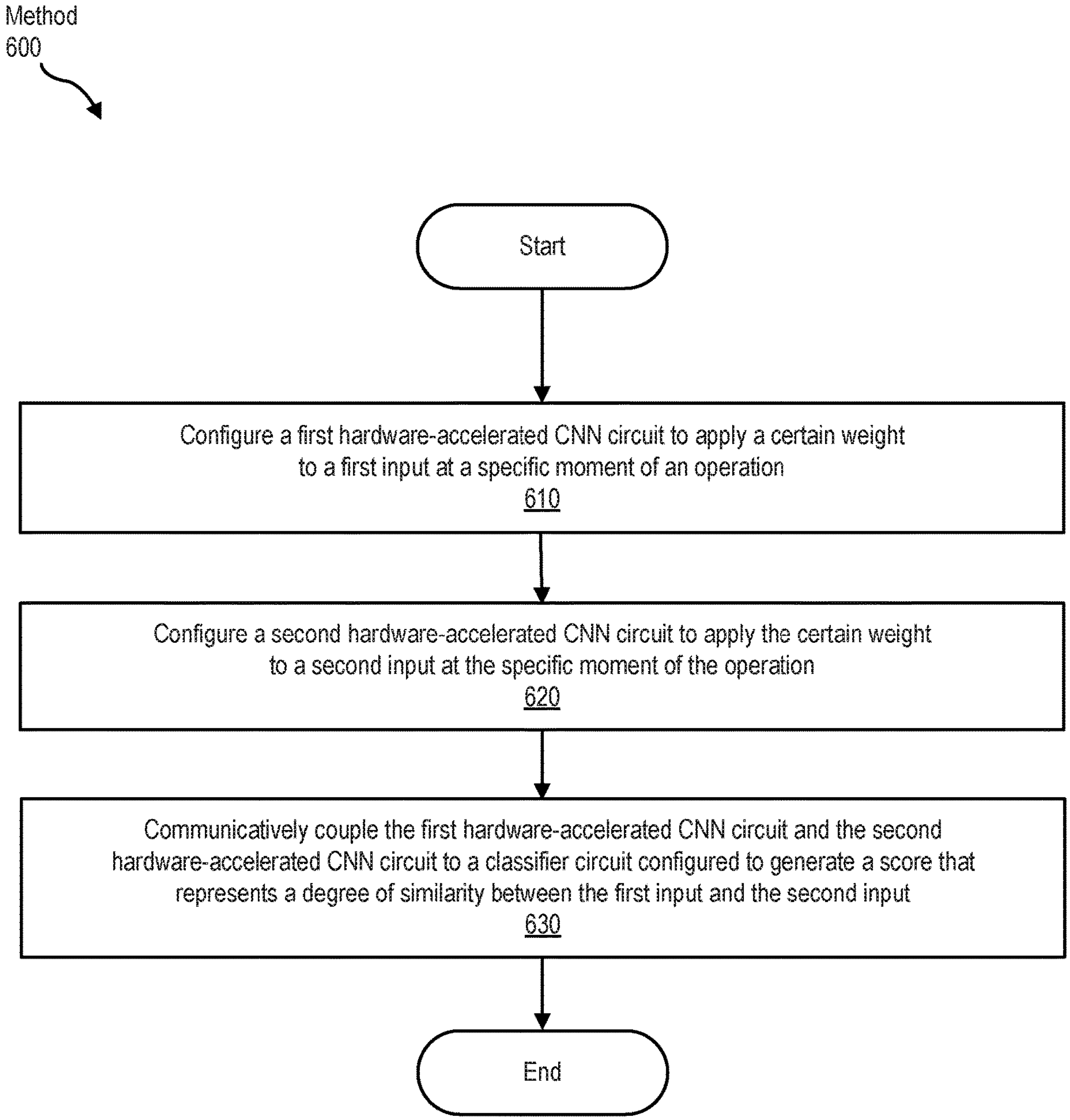
FIG. 6 is a flowchart of an exemplary method for accelerating siamese neural networks according to one or more implementations of this disclosure.

FIG. 6 is a flow diagram of an exemplary method 600 for accelerating siamese neural networks. In one example, the steps shown in FIG. 6 can be performed and/or executed in connection with the manufacturing, assembly, and/or creation of a hardware-accelerated siamese neural network device. Additionally or alternatively, the steps shown in FIG. 6 can also incorporate and/or involve various sub-steps and/or variations consistent with the descriptions provided above in connection with FIGS. 1-5.

As illustrated in FIG. 6, exemplary method 600 include and/or involve the step of configuring a first hardware-accelerated CNN circuit to apply a certain weight to a first input at a specific moment of an operation (610). Step 610 can be performed in a variety of ways, including any of those described above in connection with FIGS. 1-5. For example, a computing hardware manufacturer or subcontractor can configure, create, and/or assemble a first hardware-accelerated CNN circuit to apply a certain weight to a first input at a specific moment of an operation.

Exemplary method 600 also includes the step of configuring a second hardware-accelerated CNN circuit to apply the certain weight to a second input at the specific moment of the operation (620). Step 620 can be performed in a variety of ways, including any of those described above in connection with FIGS. 1-5. For example, the computing hardware manufacturer or subcontractor can configure, create, and/or assemble a second hardware-accelerated CNN circuit to apply the certain weight to a second input at the specific moment of the operation.

Exemplary method 600 further includes the step of communicatively coupling the first hardware-accelerated CNN circuit and the second hardware-accelerated CNN circuit to a classifier circuit configured to generate a score that represents a degree of similarity between the first input and the second input (630). Step 630 can be performed in a variety of ways, including any of those described above in connection with FIGS. 1-5. For example, the computing hardware manufacturer or subcontractor can communicatively couple and/or connect the first hardware-accelerated CNN circuit and the second hardware-accelerated CNN circuit to a classifier circuit configured to generate and/or produce a score that represents a degree of similarity between the first input and the second input.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality. Furthermore, the various steps, events, and/or features performed by such components should be considered exemplary in nature since many alternatives and/or variations can be implemented to achieve the same functionality within the scope of this disclosure.

The devices, systems, and methods described herein can employ any number of software, firmware, and/or hardware configurations. For example, one or more of the exemplary implementations disclosed herein can be encoded as a computer program (also referred to as computer software, software applications, computer-readable instructions, and/or computer control logic) on a computer-readable medium. In one example, when executed by at least one processor, the encodings of the computer-readable medium cause the processor to generate and/or produce a computer-readable representation of an integrated circuit configured to do, perform, and/or execute any of the tasks, features, and/or actions described herein in connection with FIGS. 1-6.

The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and/or other distribution systems. In addition, one or more of the modules, instructions, and/or micro-operations described herein can transform data, physical devices, and/or representations of physical devices from one form to another.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the instant disclosure. The implementations disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A hardware-accelerated siamese neural network device comprising:
- a systolic array including a plurality of data processing units (DPUs) configured to process a first input and a second input in parallel, wherein the plurality of DPUs includes (1) a first hardware-accelerated convolutional neural network (CNN) circuit configured to apply a weight to a first value derived from the first input, and (2) a second hardware-accelerated CNN circuit configured to apply the weight to a second value derived from the second input, wherein the weight is applied to the first value and the second value simultaneously; and
- a classifier circuit configured to generate a score that represents a degree of similarity between the first input and the second input.

2. The hardware-accelerated siamese neural network device of claim 1, further comprising at least one application specific integrated circuit (ASIC) that includes the systolic array and the classifier circuit.

3. The hardware-accelerated siamese neural network device of claim 1, wherein the DPUs included in the systolic array are communicatively coupled to one another via a plurality of data lanes that facilitate passing the first value and the second value from one of the DPUs to another one of the DPUs simultaneously.

4. The hardware-accelerated siamese neural network device of claim 1, wherein:
- the first hardware-accelerated CNN circuit is equipped with a first data lane configured to feed the first value to a first DPU included in the systolic array; and
- the second hardware-accelerated CNN circuit is equipped with a second data lane configured to feed the second value to the first DPU included in the systolic array; and
- wherein the first value and the second value are fed to the first DPU simultaneously.

5. The hardware-accelerated siamese neural network device of claim 1, wherein each of the DPUs comprises a plurality of processing lanes that facilitate simultaneous processing of the first input and the second input in parallel.

6. The hardware-accelerated siamese neural network device of claim 5, wherein each of the processing lanes comprises a multiply circuit and an add circuit.

7. The hardware-accelerated siamese neural network device of claim 1, wherein the DPUs included in the systolic array:
- are communicatively coupled to one another via a single data lane; and
- are configured to:
  - vectorize the first input and the second input into a data vector; and
  - pass the data vector from one of the DPUs to another one of the DPUs via the single data lane for subsequent processing.

8. The hardware-accelerated siamese neural network device of claim 1, wherein:
- the first hardware-accelerated CNN circuit is further configured to output a first fully connected layer representative of a first convolution performed on the first input;
- the second hardware-accelerated CNN circuit is further configured to output a second fully connected layer representative of a second convolution performed on the second input; and
- the classifier circuit is further configured to generate the score by comparing the first fully connected layer and the second fully connected layer to one another.

9. The hardware-accelerated siamese neural network device of claim 8, wherein the classifier circuit is further configured to compare the first fully connected layer and the second fully connected layer by applying a sigmoid activation function.

10. The hardware-accelerated siamese neural network device of claim 1, further comprising a storage device configured to store the first input in a dataset, wherein:
- the first input includes a reference object known to belong to a certain class of interest; and
- the second input includes an unknown object.

11. The hardware-accelerated siamese neural network device of claim 1, wherein:

the first hardware-accelerated CNN circuit is trained with a set of training data; and the second hardware-accelerated CNN circuit is trained with the set of training data such that both the first hardware-accelerated CNN circuit and the second hardware-accelerated CNN circuit share identical weights upon completion of training.

12. The hardware-accelerated siamese neural network device of claim 11, wherein the set of training data comprises:

positive data pairs that belong to a single class of interest; and negative data pairs that belong to different classes of interest; and the classifier circuit is trained by randomly sampling examples of the positive data pairs and the negative data pairs.

13. The hardware-accelerated siamese neural network device of claim 11, wherein the classifier circuit is trained by processing the set of training data via a loss function comprising at least one of:

a triplet loss function;

a contrastive loss function; or a binary cross-entropy loss function.

14. The hardware-accelerated siamese neural network device of claim 11, wherein the set of training data comprises:

an anchor object that belongs to a certain class of interest;

a positive object that belongs to the certain class of interest; and a negative object that belongs to a class different from the certain class of interest; and the classifier circuit is trained by deliberately sampling the anchor object, the positive object, and the negative object in connection with the certain class of interest.

15. The hardware-accelerated siamese neural network device of claim 1, wherein the classifier circuit is further configured to:

classify the second input based at least in part on the score; and provide a classification of the second input to a computing circuit configured to perform at least one action in response to the classification.

16. A system comprising:

a storage device configured to store reference data; and a hardware-accelerated siamese neural network communicatively coupled to the storage device, the hardware-accelerated siamese neural network comprising:

a systolic array including a plurality of data processing units (DPUs) configured to process a first input and a second input in parallel, wherein the plurality of DPUs includes (1) a first hardware-accelerated convolutional neural network (CNN) circuit configured to apply a weight to a first value derived from the first input, and (2) a second hardware-accelerated CNN circuit configured to apply the weight to a second value derived from the second input comprising at least a portion of the reference data, wherein the weight is applied to the first value and the second value simultaneously; and a classifier circuit configured to generate a score that represents a degree of similarity between the first input and the second input.

17. The system of claim 16, further comprising at least one application specific integrated circuit (ASIC) that includes the systolic array and the classifier circuit.

18. A method comprising:

within a systolic array including a plurality of data processing units (DPUs) configured to process a first input and a second input in parallel, (1) configuring a first hardware-accelerated convolutional neural network (CNN) circuit to apply a weight to a first value derived from the first input, and (2) configuring a second hardware-accelerated CNN circuit to apply the weight to a second value derived from the second input, wherein the weight is applied to the first value and the second value simultaneously; and communicatively coupling the first hardware-accelerated CNN circuit and the second hardware-accelerated CNN circuit to a classifier circuit configured to generate a score that represents a degree of similarity between the first input and the second input.

* * * * *